Figure 1:
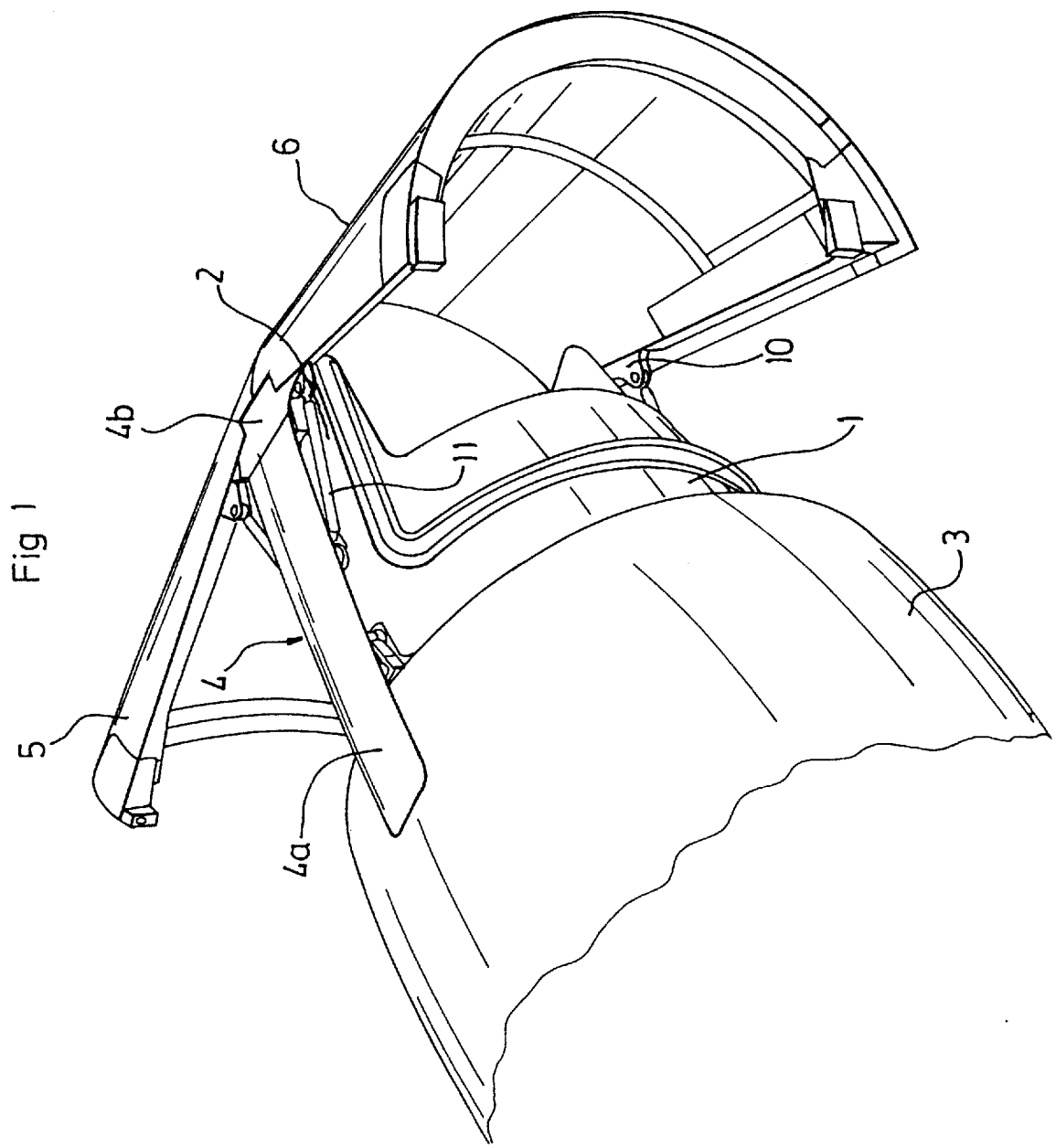

United States Patent
Servanty

[19]

[11] Patent Number: 5,836,149

[45] Date of Patent: Nov. 17, 1998

[54] THRUST REVERSER PROVIDED WITH AT LEAST ONE SWING DOOR AND CONSTRUCTED TO PERMIT A BEARING SURFACE OF REDUCED THICKNESS OF THE TRAILING EDGE, FOR A JET ENGINE, NOTABLY THAT OF AN AIRCRAFT, AND A JET ENGINE EQUIPPED WITH THIS THRUST REVERSER

[75] Inventor: Guy Servanty, Leguevin, France

[73] Assignee: Conception Aeronautique Du Sud-Ouest, Blagnac, France

[21] Appl. No.: 863,722

[22] Filed: May 27, 1997

Related U.S. Application Data

[63] Continuation of Ser. No. 409,001, Mar. 23, 1995, abandoned.

[30] Foreign Application Priority Data

Mar. 28, 1994 [FR] France ................................... 94.03920

[51] Int. Cl.⁶ ............................... F02K 1/60; F02K 1/11
[52] U.S. Cl. ...................... 60/226.2; 60/230; 244/110 B; 239/265.29; 239/265.19
[58] Field of Search ................................ 60/226.1, 226.2, 60/230; 239/265.15, 265.27, 265.29, DIG. 22, 265.13; 244/110 B

[56] References Cited

U.S. PATENT DOCUMENTS

| | | | |
|---|---|---|---|
| 3,579,991 | 5/1971 | Nelson . | |
| 3,604,662 | 9/1971 | Nelson . | |
| 4,129,269 | 12/1978 | Fage | 60/262.2 |
| 4,362,015 | 12/1982 | Fage | 60/262.2 |
| 4,424,669 | 1/1984 | Fage | 60/230 |
| 4,437,627 | 3/1984 | Moorehead | 60/262.2 |
| 4,519,561 | 5/1985 | Timms | 244/110 B |
| 4,581,890 | 4/1986 | Giraud | 60/230 |
| 5,097,661 | 3/1992 | Lair et al. | 60/226.2 |
| 5,176,340 | 1/1993 | Lair . | |
| 5,392,991 | 2/1995 | Gatti et al. | 239/265.29 |

FOREIGN PATENT DOCUMENTS

| | | |
|---|---|---|
| 366829 | 5/1990 | European Pat. Off. . |
| 574730 | 12/1993 | European Pat. Off. . |
| 2348371 | 11/1977 | France . |
| 1588384 | 4/1981 | United Kingdom . |
| 2075447 | 11/1981 | United Kingdom . |

Primary Examiner—Timothy Thorpe
Assistant Examiner—Ted Kim
Attorney, Agent, or Firm—D. Peter Hochberg; William R. Hinds; William H. Holt

[57] ABSTRACT

The invention concerns a thrust reverser for a jet engine, of the type having swing doors (6) pivoting about fixed transverse pivots (7) secured to the rear end of flanges extending in line with pipe of the engine. According to the invention, each door (6) is borne by a connecting piece (10) offset towards the front with respect to a transverse plane passing through the pivot axis and orthogonal to the longitudinal axis of the door. Furthermore, the fairing (4a, 4b) extends as far as the rear end of the flanges, the said fairing and each door (6) being arranged, on the one hand, so as to cover completely the flanges in the folded position of the said door, and, on the other hand, to enable each door (6) to be brought into its deployed position without any interference between the said fairing and door.

7 Claims, 5 Drawing Sheets

THRUST REVERSER PROVIDED WITH AT LEAST ONE SWING DOOR AND CONSTRUCTED TO PERMIT A BEARING SURFACE OF REDUCED THICKNESS OF THE TRAILING EDGE, FOR A JET ENGINE, NOTABLY THAT OF AN AIRCRAFT, AND A JET ENGINE EQUIPPED WITH THIS THRUST REVERSER

This is a continuation of application Ser. No. 08/409,001 filed Mar. 23, 1995 now abandoned.

The invention concerns a thrust reverser provided with at least one swing door, for a jet engine, notably that of an aircraft. It extends to a jet engine equipped with this thrust reverser.

Thrust reversers for jet engines are used for shortening the stopping distance during the braking of an aircraft, through a reversal of the direction of the gas jet delivered by the engine, which produces a reverse braking thrust.

Conventionally, these thrust reversers include at least one door disposed in line with the pipe and mounted so as to pivot about a transverse axis, each of the said doors being associated with pivot means arranged so as to cause it to pivot between two extreme positions: a folded position in which each door has the same profile on the outside as the fairing of the engine, and forms on the inside the extension of the pipe, and a deployed position in which each door intercepts the gas jet leaving the pipe, then participating actively in the braking of the aircraft by reversing the said gas jet.

Such thrust reversers, described notably in the patents FR 2 348 371 and EP 175 599, provide full satisfaction as regards their reliability and their performance in the braking phase of the aircraft. On the other hand, they have a major drawback in the flight phase of the aircraft, owing to the fact that these thrust reversers create an additional aerodynamic drag due to the high thickness of the base surface of the trailing edge of each door, which leads to a loss of internal thrust.

At the present time, two solutions have been proposed for overcoming this drawback and reducing the thickness of the base surface.

The first solution, described notably in the patents FR 2 638 783 and U.S. Pat. No. 5,176,340, consists of equipping the thrust reverser with retractable shutters arranged so as to be positioned in line with the doors, with the latter in the folded position, and making the inner and outer faces of the said doors continuous. Such shutters, the thickness of which decreases from their upstream end to their downstream end, enable a trailing edge with a reduced thickness to be obtained that significantly reduces the aerodynamic drag. However, this advantage is obtained by means of the addition of movable shutters whose actuation means significantly increase the mechanical complexity of the thrust reverser.

The second solution, described notably in the patent FR 2 601 077, consisted of extending the nacelle beyond the swing doors, so that the said doors are disposed part way along the length of the said nacelle and do not in any way influence the shape and thickness of the trailing edge. However, such a solution requires, on the one hand, the elongation of the nacelle, and therefore results in the addition of additional mass, and, on the other hand, results in a geometric limitation of the swing doors, and therefore a reduction in the braking effect of the latter.

The present invention aims to overcome the drawbacks referred to above and has as its principal objective the furnishing of a solution that enables the thickness of the base surface of the thrust reversers to be reduced in a very simple manner to a substantially constant minimum value, without necessitating an addition of mechanical components and/or additional mass.

To this end, the invention relates to a thrust reverser for a jet engine, notably that of an aircraft, comprising a pipe extended by flanges, and a fairing covering the pipe and the flanges, the said thrust reverser having:

at least one door provided with a rear end face having a trailing edge extending along a plane which is oblique with respect to the longitudinal axis of this door, each of the said doors being disposed in line with the pipe and borne by connecting pieces pivoting about transverse pivots fixed to the flanges, towards the rear end of the latter, pivoting means for each door, arranged so as to cause it to pivot between two extreme positions:

a folded position in which each door lies in line with the pipe so as to have, on the outside, the same profile as the fairing, and to form on the inside, with the flanges, the extension of the pipe, a deployed position in which each door is disposed in such a way that its rear face is substantially parallel to the longitudinal axis of the engine.

According to the invention, this thrust reverser is characterised in that:

each connecting piece includes a structural joint fixed respectively to the corresponding door and flange, offset towards the front with respect to a transverse plane passing through the pivot axis and orthogonal to the longitudinal axis of the door, the fairing extends as far as the rear end of the flanges, the said fairing and each door being arranged, on the one hand, so as to cover completely the flanges in the folded position of the said door, and, on the other hand, to enable each door to be brought into its deployed position without any interference between the said fairing and door.

The invention therefore consisted of producing connecting pieces designed to free completely the space between the flanges and the fairing, at the rear of the pivots, and extend the fairing as far as the rear end of the flanges in such a way that the latter are joined together at the said rear end, whilst moreover designing this fairing and each door in such a way that they entirely cover the said flanges in the folded position of each of the doors.

Owing to the fact that the flange and the fairing are joined at their rear end by virtue of the design of the connecting piece, such a solution allows, in a very simple manner and without the addition of components or of weight, the production of a base surface substantially identical to that of a jet engine having the same characteristics and without a thrust reverser.

Furthermore, and in a non-obvious way, this arrangement of the connecting pieces not only does not detract at all from the mechanical strength of the said connecting pieces in cases of extreme stresses (with doors deployed), but, on the contrary, it proves extremely favourable for absorbing the reverse-thrust forces as directly as possible.

According to another characteristic of the invention, the thrust reverser comprises connection means connecting each flange and the fairing to the rear of the pivots.

Such an arrangement enables the end of the flanges which is mechanically connected to the fairing to be made rigid, and no longer free of any connection as produced at the moment.

Furthermore, the fairing comprises, advantageously, in line with each flange, a fixed section extending to the rear of the pivots and a removable section extending in front of the said pivots.

The removable section of the fairing forms a "cap" allowing access to the pivoting structure of each door for the purpose of maintenance operations, etc, while the fixed section is structural, that is to say it forms part of the structure taken into account with regard to the absorption of forces.

Furthermore, according to another characteristic of the invention, each connecting piece comprises a connecting arm between the structural joint and the pivot axis, inclined forwards at an angle suitable for the longitudinal axis of the said arm to coincide with the direction of the resultant of the forces applied to the pivots in the deployed position of the corresponding door.

Such an arrangement, permitted by virtue of the design according to the invention of the connecting pieces, enables an optimum channelling of the forces to be obtained in the case of an extreme load in terms of forces (with doors deployed) and leads to the production of connecting pieces of optimum weight.

Furthermore, according to a preferential embodiment, each door has rear corners having a cutout, the fairing having, in line with the flanges, a rear end provided with lateral extensions arranged so as to be superimposed with the cutouts in each door, in the folded position of the latter.

It should be noted that the presence of the lateral extensions of the fairing also enables the length of the oblique cutout to be reduced in the case of a thrust reverser provided with two swing doors, enabling a rear face to be obtained that approaches the theoretical arrangement consisting of a plane rear face.

According to another characteristic of the invention relating to a thrust reverser in which the pivot means include a central jack and control rods articulated on the said jack and on the connecting pieces at the level of the structural joint of the latter, each door has a rear reinforcing frame extending substantially in line with the rods, in the deployed position of the corresponding door.

Such an arrangement is suitable for assisting the absorption of forces in the rods controlling the pivoting of the doors.

The invention extends, moreover, to a jet engine, notably for an aircraft, equipped with a thrust reverser having any one of the characteristics set out below.

Figure 2:
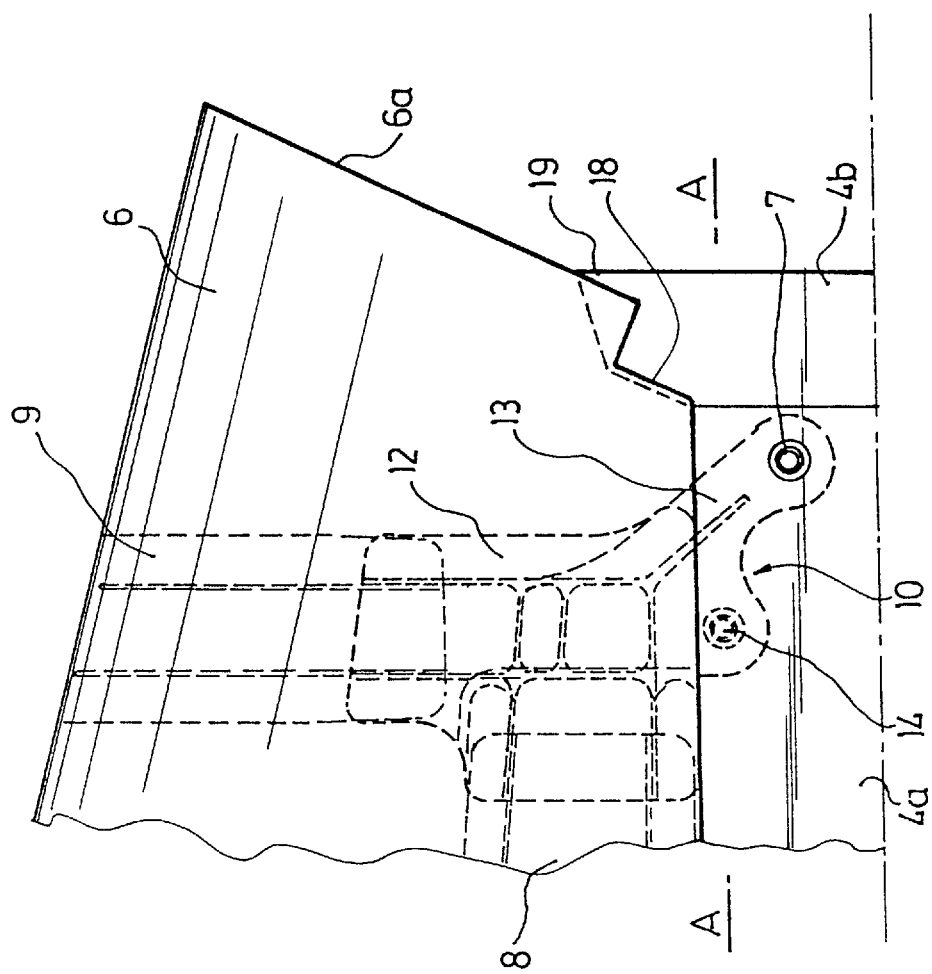
Figure 3:
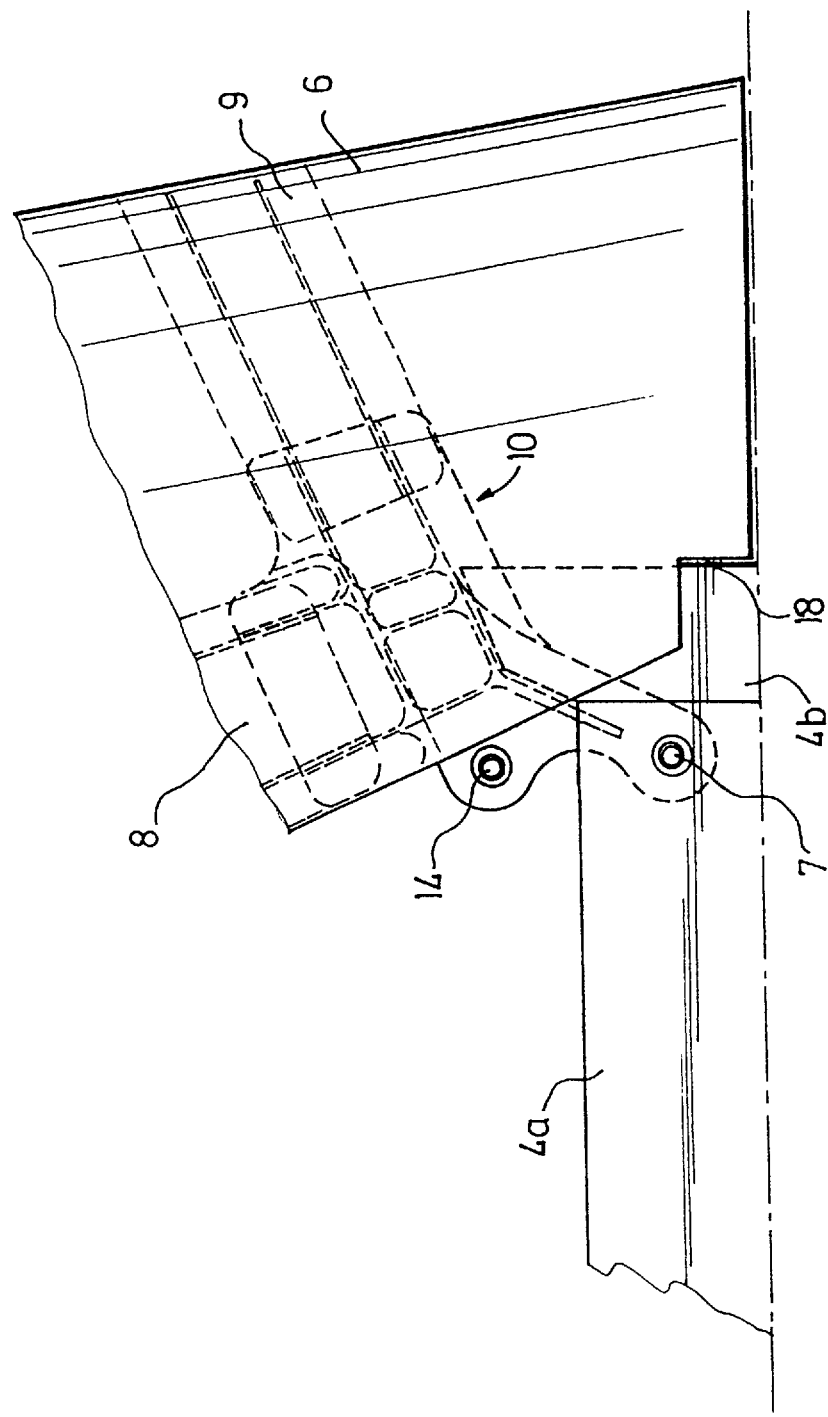
Figure 4:
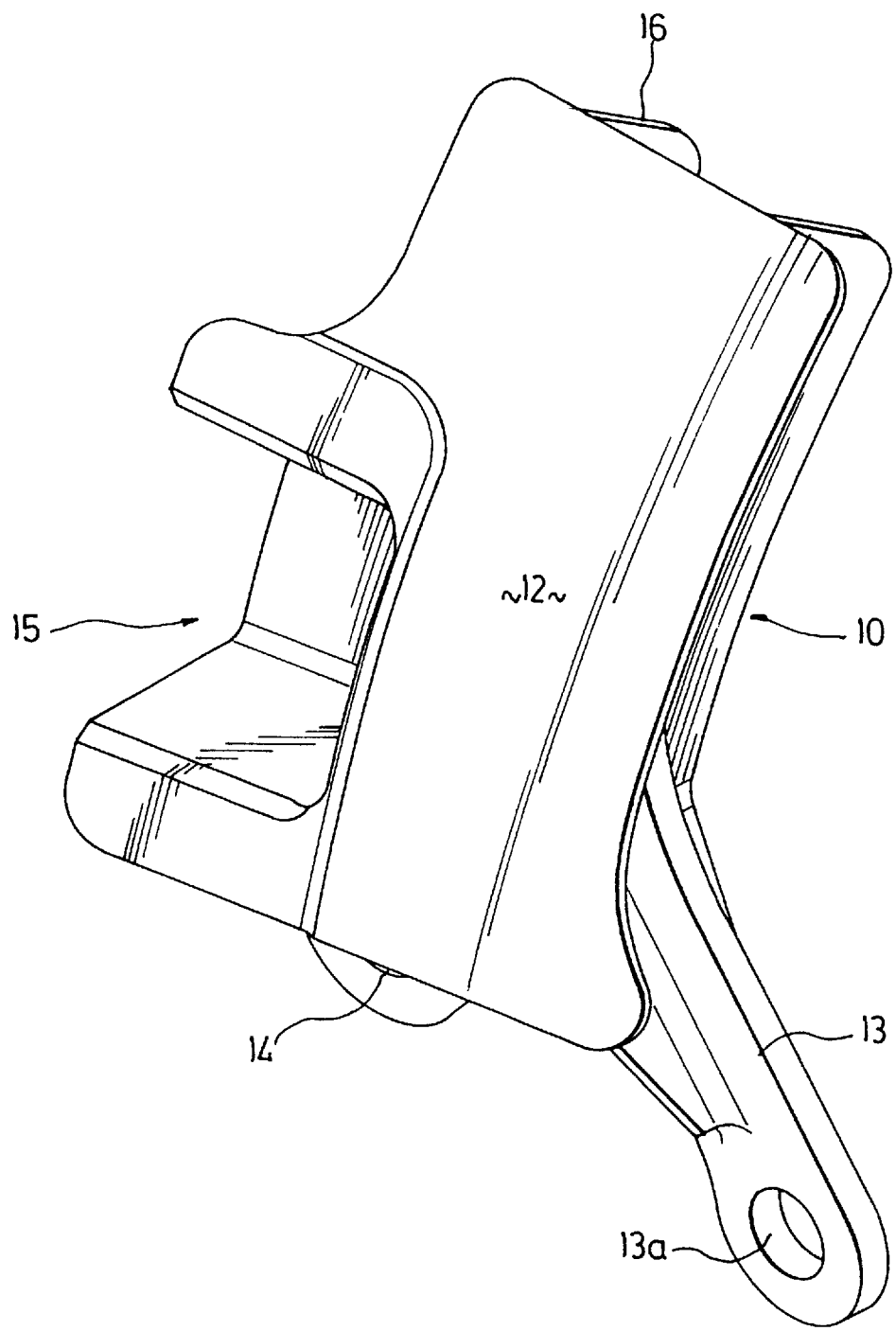
Figure 5:
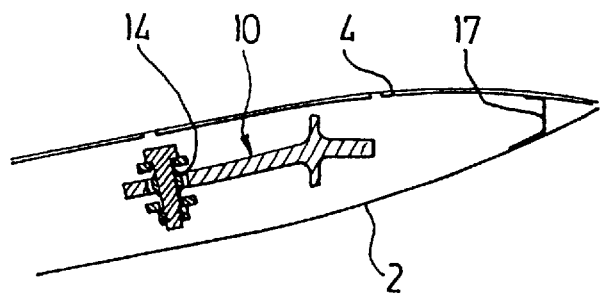
Figure 6:
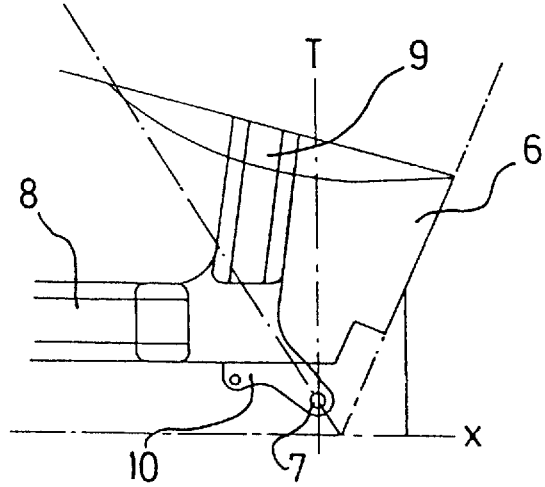
Figure 7:
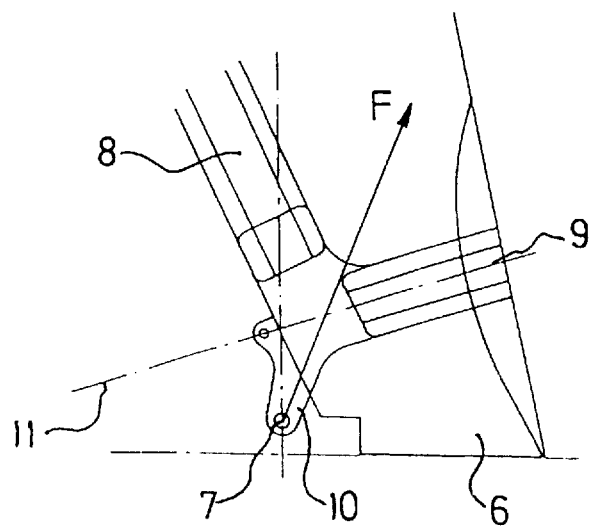

Other characteristics, aims and advantages of the invention will emerge from the detailed description that follows with reference to the accompanying drawings which depict by way of non-limitative example a preferential embodiment thereof. In the drawings, which form an integral part of the present description:

FIG. 1 is a partial perspective view of a jet engine equipped with a thrust reverser in accordance with the invention, provided with two swing doors depicted in their deployed position, FIG. 2 is a plan view of the rear section of this engine, with the doors of the thrust reverser in the folded position, FIG. 3 is a plan view of the rear section of the engine, with the doors of the thrust reverser in the deployed position, FIG. 4 is a perspective view of a connecting piece in accordance with the invention, FIG. 5 is a partial longitudinal section along a vertical plane A of the rear end of the engine in line with a flange, and FIGS. 6 and 7 are two diagrammatic depictions of the rear section of the engine, in plan view, with the doors in the folded and deployed positions respectively.

The jet engine with thrust reverser depicted in FIG. 1 has, in a conventional manner, a pipe 1 extended by two diametrically opposite flanges such as 2.

The fairing 3 of this engine is, for its part, interrupted at a distance from the rear end of the pipe 1, and has two bands of fairing such as 4 in line with the main body of this fairing so as to each cover a flange 2.

The thrust reverser of this jet engine has, for its part, two doors 5, 6 mounted so as to swing about fixed transverse pivots such as 7 secured to the rear end of the flanges 4.

These doors 5, 6, the overall shape of which is tapered, are principally made rigid, in a conventional manner, by means of two longitudinal members such as 8 extending along their longitudinal edges and a rear transverse frame 9 formed from -shaped profiled members, the said spars and transverse frame being fixed to connecting pieces 10, described in detail below, pivoting about transverse pivots 7.

Each of these doors 5, 6 has a rear face 5a, 6a extending along a plane which is oblique with respect to the longitudinal axis of the said doors, and is associated with pivoting means suitable for causing them to pivot between two extreme positions:

a folded position in which these doors 5, 6 extend in line with the fairing body 3, in such a way as to have the same external profile as the fairing body 3 and the fairing bands 4, and to form on the inside, with the flanges 2, the extension of the pipe 1. Furthermore, in this folded position, the rear faces 5a, 6a of the doors 5, 6 delimit an oblique cutout whose shape may be defined as a "fish mouth".

It should be noted, moreover, that the transverse pivots 7 are arranged in such a way that the pivot axis of each door 5, 6 intersects the bisector (b) of the angle defined by the longitudinal axis (x) of the engine and the rear face 5a, 6a of the said door, with the latter in the folded position (cf FIG. 6);

a deployed position in which the doors 5, 6 are in abutment against each other through their rear face 5a, 6a, and in which the said doors are disposed in such a way as to intercept and reverse the gas jet emerging from the pipe 1.

The pivot means of these doors 5, 6 have, at the level of each flange 2, a central jack disposed longitudinally between the said flange 2 and the corresponding fairing band 4 (this jack being masked in FIG. 1 by the associated fairing band), and two rods such as 11 pivoting on the central jack and each on a connecting piece 10.

The principal constituent elements of the thrust reverser and the jet engine having been described, their characteristics relating to the invention that is the object of the present application are defined hereinafter.

In the first place, each connecting piece 10 has a shape that is suitable for the said connecting piece to be entirely offset forwards with respect to a transverse plane (T) passing through the pivot axis of the corresponding door 5, 6 and orthogonal to the longitudinal axis (x) of the engine (assuming the door to be in its closed position as depicted in FIG. 6). This shape for the connecting pieces has the essential advantage of completely freeing the rear base of the doors 5, 6.

As depicted in FIG. 4, each connecting piece 10 has a structural joint 12 designed for the fishplating of a longitudinal member 8 and one of the ends of the rear frame 9, and an inclined arm 13 provided towards its end with an orifice 13a suitable for housing an articulation pivot 7.

Each connecting piece 10 has, moreover, an eye 14 disposed in line with and below the structural joint 12.

This structural joint 12 has a face provided with a front fishplating zone 15, the cross section of which is conjugate with that of the longitudinal members 8, suitable for housing the end of one of the said longitudinal members and for enabling it to be fixed.

This structural joint 12 has an opposite face having two parallel fins, such as 16, arranged so as to be covered by the end of the rear frame 9 and to enable this frame to be fixed to the opposite face of the structural joint 12.

Moreover, and as depicted in FIG. 7, the arm 13 of each connecting piece 10 is inclined at an angle suitable for the longitudinal axis of the said arm to coincide with the direction of the resultant F of the forces applied to the pivots 7 with the doors 5, 6 in the deployed position, so that there is an optimal channelling of the forces in the case of an extreme load.

Furthermore, and as depicted in FIG. 7, the eye 14 is disposed in such a way that the longitudinal axis of the rods 11 (schematically indicated by broken line 11) is coaxial with the axis of symmetry of the rear frame 9, with the doors 5, 6 in the deployed position, so that, at the start of the folding of these doors, the force exerted by the rods 11 directly affects the frame 9. This arrangement is notably of interest when it is necessary to actuate the folding of the deployed doors before the aircraft stops, for example if the intention is to take off again immediately.

Secondly, the fairing bands 4 extend as far as the rear end of the flanges 2, so that, as shown by FIG. 5, the thickness of the base in line with these flanges 2 is at a minimum.

Moreover, as depicted in FIG. 5, the fairing bands 4 and the flanges 2 are connected at their rear end by a connecting brace 17 which makes the assembly rigid.

Furthermore, in order to enable the doors 5, 6 to be deployed without interference between the fairing bands 4 and the said doors, the latter have rear corners having a cutout 18 substantially at a right angle, suitable for preventing interference at the end of deployment.

At the same time, the fairing bands 4 have, at their rear end, lateral extensions, such as 19, the shapes of which are suitable for obstructing the cutouts 18 of the doors 5, 6 in the folded position of the latter.

Furthermore, such lateral extensions 19 enable, as depicted in FIG. 3, the depth of the oblique cutout with the doors 5, 6 in the folded position to be reduced, and thus enable the theoretical arrangement consisting of a plane rear face to be approached.

Finally, each fairing band 4 is divided longitudinally into two sections: a front section 4a suitable for affording access to the pivot structure extending substantially as far as the perpendicular to the lateral extensions 19, and a fixed rear section 4b forming an integral part of the structure.

What is claimed is:

1. A thrust reverser for a jet engine, notably that of an aircraft, comprising a pipe extended by flanges, and a fairing covering the pipe and the flanges, said thrust reverser having:

at least one door having outer and inner surfaces and provided with a rear end face having a trailing edge extending along a plane which is oblique with respect to the longitudinal axis of this door, each of said doors being disposed in line with the pipe and borne by connecting pieces pivoting about transverse pivots fixed to the flanges, towards the rear end of the latter, pivoting means for each door, arranged so as to cause it to pivot about the axis of said pivots between two extreme positions:

a folded position in which each door lies in line with the pipe so as to have, on the outer surface of the door, the same profile as the fairing, and to form on the inner surface of the door, with the flanges, an extension of the pipe, a deployed position in which each door is disposed in such a way that its rear face is substantially parallel to the longitudinal axis of the engine, wherein each connecting piece being integral with said door and including a connecting arm fixed to the flange, each connection piece includes a structural joint offset towards the front relative to a transverse plane passing through the fronts of the pivots of the doors and orthogonal to the longitudinal axis of the door, the fairing extends as far as the rear end of the flanges and is connected to the flanges to obtain a bearing plate of minimal thickness when the doors are in their deployed position, said fairing and each door being arranged, on the one hand, so as to cover completely the flanges in the folded position of the said door, and, on the other hand, to enable each door to be brought into its deployed position completely clearing the space between the internal flange and the external fairing without any interference between said fairing and door.

2. The thrust reverser as claimed in claim 1, comprising connection means connecting each flange and the fairing rearwardly of the axis of said pivots.

3. The thrust reverser as claimed in claim 1, wherein the fairing has, in line with each flange, a fixed section extending rearwardly of the axis of said pivots and a removable section extending in front of said pivots.

4. The thrust reverser as claimed in claim 1, wherein said connecting arm between the structure joint and the axis of said pivots, inclined forwardly from the pivot axis at an angle suitable for the longitudinal axis of the said arm to coincide with the direction of the resultant of the forces applied to the pivots in the deployed position of the corresponding door.

5. The thrust reverser as claimed in claim 1, wherein each door has rear corners having a cutout, the fairing having, in line with the flanges, a rear end provided with lateral extensions arranged so as to be superimposed with the cutouts in each door, in the folded position of the latter.

6. The thrust reverser as claimed in claim 1, in which the pivot means for each door include actuatable control rods articulated on the connecting pieces at the level of the structural joint of the connecting pieces, said reverser being wherein each door has a rear reinforcing frame extending substantially in line with the rods, in the deployed position of the corresponding door.

7. A jet engine, notably for an aircraft, comprising a thrust reverser in accordance with claim 1.

* * * * *